United States Patent
Whitney et al.

(10) Patent No.: US 6,710,156 B2
(45) Date of Patent: *Mar. 23, 2004

(54) METHOD FOR END-CAPPING POLYCARBONATE RESINS AND COMPOSITION FOR USE IN SAME

(75) Inventors: John Morgan Whitney, Niskayuna, NY (US); Hans-Peter Brack, Herrliberg (CH); Theodorus Lambertus Hoeks, Bergen op Zoom (NL); Irene Dris, Clifton Park, NY (US); Dennis Karlik, Bergen op Zoom (NL)

(73) Assignee: General Electric Company, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/268,395

(22) Filed: Oct. 10, 2002

(65) Prior Publication Data

US 2003/0144456 A1 Jul. 31, 2003

Related U.S. Application Data

(63) Continuation-in-part of application No. 09/682,723, filed on Oct. 10, 2001.

(51) Int. Cl.$^7$ .............................................. C08G 64/00
(52) U.S. Cl. ........................ 528/196; 366/337; 422/131; 528/198
(58) Field of Search ........................ 366/337; 422/131; 528/196, 198

(56) References Cited

U.S. PATENT DOCUMENTS

| | | | |
|---|---|---|---|
| 6,300,459 B1 | 10/2001 | Kaneko et al. | |
| 6,500,914 B1 * | 12/2002 | Brack et al. | 528/196 |
| 6,525,163 B1 * | 2/2003 | Brack et al. | 528/196 |

* cited by examiner

Primary Examiner—Terressa Boykin
(74) Attorney, Agent, or Firm—Oppedahl & Larson LLP

(57) ABSTRACT

A method for end-capping polycarbonate resins, comprising the step of processing a mixture comprising a polycarbonate having free hydroxyl-end groups and an end-capping reagent in a melt transesterification reaction to produce a polycarbonate resin, wherein the end-capping reagent comprises a mixture of:

(a) at least one species of a symmetrical activated aromatic carbonate, and
(b) at least one species of an optionally-substituted phenol, whereby said end-capping reagent reacts with at least some of the free hydroxyl end-groups of the polycarbonate to produce an end-capped polycarbonate resin.

47 Claims, No Drawings

METHOD FOR END-CAPPING POLYCARBONATE RESINS AND COMPOSITION FOR USE IN SAME

CROSS-REFERENCE TO RELATED APPLICATIONS

This application is a continuation-in-part of copending application Ser. No. 09/682,723 filed Oct. 10, 2001.

BACKGROUND OF THE INVENTION

This application relates to a method for end-capping polycarbonate resins and to end-capping compositions useful in such a method.

Polycarbonates prepared by the reaction of a dihydric phenol (such as bisphenol A, "BPA") and a diaryl carbonate (such as diphenyl carbonate, "DPC") in a melt transesterification process generally contain significant levels of uncapped chains (7–50%) as compared to interfacially prepared polycarbonates. These uncapped chains can have a significant impact on the resulting properties of polycarbonate, and it is therefore desirable in many instances to include an end-capping agent with a higher capping efficiency than DPC during or after the polymerization reaction which terminates the uncapped chains.

Known end-capping reagents are frequently carbonate or ester derivatives of phenol or even monohydric phenols themselves. EP 360578 discloses the use of sequestering agents to sequester hydroxy terminal groups to improve the following properties of melt polycarbonate: heat resistance, water resistance (resistance to hydrolysis), and color tone and tensile strength even after immersion in boiling water. In particular, the Examples of the '578 patent teach the use of para-cumylphenol, 2-carbomethoxy-5-tert-butylphenyl phenyl carbonate, 2-carbobutoxy-5-tert-butylphenyl phenyl carbonate, p-cumylphenyl phenyl carbonate, p-cumylphenyl phenyl carbonate, and diphenyl carbonate as sequestering agents which are added to the initial monomer mix vessel of a continuous reactor system. Unfortunately the addition of excess carbonate or especially monohydric phenols to the initial monomer mix stage of the melt or transesterification process limits the reaction kinetics and thus achievable molar mass and end-cap level. U.S. Pat. No. 4,680,372 discloses the use of phenyl benzoate as an end-capping reagent to terminate polymers formed by melt polymerization of a bisphenol and an aromatic dicarboxylic acid such as terephthalic acid and/or isophthalic acid. U.S. Pat. No. 4,886,875 describes preparation of polyarylate compositions using diaryl carbonates, polyarylcarbonate oligomers or polyarylcarbonate polymers as end-capping agents. In particular, the Examples of the '875 patent teach the use of diphenyl carbonate or highly endcapped polycarbonate oligomers as end-capping agents. Unfortunately these end-capping reagents all yield the byproduct phenol, which then rapidly re-equilibrates with the polycarbonate to limit the achievable molar mass and end-cap level. Long reaction and devolatization times are required to counteract this effect.

Therefore known end-capping reagents are frequently also carbonate or ester derivatives of electronegatively-ortho-substituted phenols which are more reactive than DPC. U.S. Pat. No. 4,310,656 describes the transesterification of bis(ortho-haloaryl)carbonates, haloaryl aryl carbonates, and a dihydric phenol, and indicates that controlled aryl end-capping is achieved. U.S. Pat. No. 4,363,905 describes the transesterification of bis(ortho-nitroaryl) carbonates, nitro aryl aryl carbonates and a dihydric phenol, and indicates that controlled aryl end-capping is achieved. It should be noted though that both bis(ortho-haloaryl) carbonates and bis(ortho-nitroaryl)carbonates have quite different properties than DPC. Thus the replacement of DPC by these compounds requires considerably different equipment and operating conditions than typically found in melt polycarbonate production. In addition the use of these compounds results in the production of colored or potentially toxic or explosive byproducts or ones that produce gaseous products containing chlorine upon combustion. Thus from product quality (transparency), handling, and environmental considerations there is a demand for the use of carbonates that are free from chlorine and nitro-activating groups. U.S. Pat. No. 4,661,567 describes the use of vinylene carbonate derivatives as end-capping agents which are added to pre-formed polycarbonates to terminate the polymers.

U.S. Pat. No. 5,696,222 describes a process for production of a terminally-blocked polycarbonate by melt transesterification of a dihydric phenol and a diaryl carbonate in the presence of an asymmetric substituted phenol ester or carbonate as an end-capping agent, and in particular end-capping agents which are salicylic acid derivatives. European Patent Publication No. 0 980 861 discloses an improved method for making such derivatives. These end-capping agents are derived from one salicylate (activated) and one non-activated phenol. While such end-capping agents are effective, they are not without their drawbacks. Specifically, such asymmetric carbonates require two separate steps for their preparation (generation of a chloroformate from one of the phenols, followed by condensation with the second phenol). This two step process adds significantly to the cost of the end-capping agent. An additional deficiency of this method is that the asymmetric mixed carbonates prepared in this way are often contaminated with traces of nitrogen- and halogen-containing impurities and with symmetrical carbonates derived from one or both of the phenols used in the reaction. As a consequence, in order to obtain materials of suitable quality for polymerization, purification is often both essential and difficult.

The '222 patent also describes the use of di-activated carbonates, for example derived from two salicylates to either couple polycarbonate chains to increase molecular weight, or to cap phenolic hydroxyl end groups. This method suffers from the fact that only salicylate (activated) end groups can be incorporated. These salicylate end groups are different from the conventional phenol or alkyl-substituted phenol end groups typically found in commercial polycarbonate resins. In addition, capping is accompanied by coupling so that it is difficult to only cap without increasing molecular weight, or to systematically vary the endcap level without varying also the polycarbonate molecular weight. Indeed, while increasing levels of conventional end-capping agents tend to decrease molecular weight, in the case of the di-activated species there are opposing tendencies where the end-capping function reduces molecular weight while the coupling function tends to increase molecular weight, making the characteristics of the product difficult to predict or control.

U.S. Pat. No. 6,300,459 discloses increasing the molecular weight of a polycarbonate by reaction with a salicylic acid ester derivative such as bis(methyl salicyl) carbonate.

SUMMARY OF THE INVENTION

It has now been found that end-capping reagents which comprise a mixture of different species, including at least:
(a) a symmetrical activated aromatic carbonate, and
(b) an optionally substituted phenol provide effective end-capping of polycarbonate resins and can provide end-capped polycarbonates with controllable amounts of functionalized end-caps and with desirable physical properties. Thus, the present invention provides an end-capping reagent, and a method for preparing an end-capped polycarbonate resin using the reagent. In accordance with an embodiment of the method of the invention a mixture comprising a polycarbonate having free hydroxyl-end groups and an end-capping reagent is processed in a melt transesterification reaction to produce a polycarbonate resin. The carbonates and phenols of the end-capping reagent reacts with at least some of the free hydroxyl end-groups of the polycarbonate to produce an end-capped polycarbonate resin.

DETAILED DESCRIPTION; PREFERRED EMBODIMENTS

This application relates to the use of an end-capping reagent that is a mixture of different species, including at least:

(a) one species of symmetrical activated aromatic carbonate, and (b) one species of optionally-substituted phenol.

This invention further relates to a method of making polycarbonate resin which uses an end-capping reagent of this type.

As used in the specification and claims of this application, the term "symmetrical activated aromatic carbonate" refers to compounds containing two phenolic groups linked through a carbonate bridge, with each phenol group being substituted with the same electronegative and therefore activating substituent at the ortho position. Many of these symmetrical activated aromatic carbonates can be represented by the general formula:

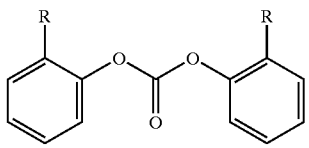

wherein R is the electronegative substituent. Preferred electronegative substituents are carbonyl-containing groups, nitro groups, and halo groups. Symmetrical activated aromatic carbonates of this type may be synthesized by the reaction of an appropriate ortho-substituted phenol with phosgene.

Symmetrical activated aromatic carbonates for use in compositions and methods in accordance with the invention may also be made either by reaction of two equivalents of an appropriate "activated" or ortho-substituted phenyl chloroformate with a bisphenol, such as bisphenol A, or by reaction of a bischloroformate with two equivalents of an "activated" or appropriate ortho-substituted phenol. Where bisphenol A is used, the resulting composition has the following general formula,

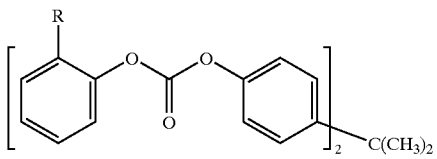

wherein R is as defined above.

Specific examples of symmetrical activated aromatic carbonates which may be used in the compositions and methods of the invention are summarized in Table 1.

As used in the specification and claims of this application, the term "optionally substituted phenol" refers to compounds containing one phenolic group. The phenol groups may be substituted or unsubstituted, provided that they do not include electronegative and therefore activating substituents at the ortho position. Many of these optionally substituted phenols can be represented by the general formula:

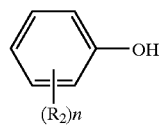

wherein each $R_2$ is independently H or some other optional substituent and n is an integer between 1 and 5. Suitable substituents which enhance the properties of the end-capped polycarbonate ultimately produced include $C_1$–$C_{36}$ alkyl (linear or branched chains), $C_1$–$C_{36}$ alkoxy (linear or branched chains), aryl (an arene group bonded directly to the phenol), aryloxy (an aryloxy group bonded directly to the phenol), arylalkyl (an arene tethered to the phenol by a linear or branched, $C_1$–$C_{36}$ alkyl), or arylalkoxy (an aryloxy tethered to the phenol by a linear or branched, $C_1$–$C_{36}$ alkyl). Specific non-limiting examples of optionally substituted phenol which may be used in the compositions and methods of the invention include phenol, p-cumylphenol, tert-butylphenol, octylphenol, nonylphenol, dodecylphenol, 3-pentadecylphenol, and octadecylphenol.

The mixture of the symmetrical activated aromatic carbonate and optionally substituted phenol may be preformed prior to addition to the melt transesterification reaction, or may be generated in situ by separate addition of the carbonate and phenolic species to the melt transesterification. This mixture, whether preformed or generated in situ, is referred to herein as the "end-capping reagent."

The relative amounts of the carbonate and phenol in the end-capping reagent can be varied depending on the product characteristics desired. Higher amounts of activated carbonate will increase the degree of coupling obtained, while higher relative amounts of the optionally substituted phenol can be used to enhance the incorporation of a particular functional group or to limit the final molecular weight. In general, the mole ratio of activated carbonate to optionally substituted phenol will suitably range from 10:90 to 90:10.

Although it can increase the cost without substantial benefit in the composition, the end-capping reagent of the invention can include asymmetrical activated carbonates. For example, the end-capping reagent may contain 25 mol % or less of an asymmetrical activated carbonate of the formula:

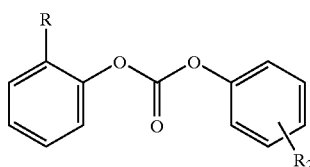

wherein R is an electronegative substituent and $R_2$ is hydrogen, $C_1$ to $C_{36}$ alkyl, $C_1$ to $C_{36}$ alkoxy, $C_6$ to $C_{36}$ aryl, $C_7$ to $C_{36}$ aralkyl, or $C_7$ to $C_{36}$ aralkoxy. The endcapping-reagent may similarly include asymmetrical non-activated carbonates, for example 25 mol % or less of a symmetrical non-activated aromatic carbonate of the formula:

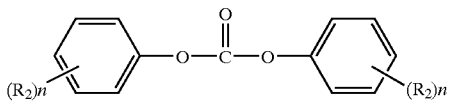

wherein $R_2$ is hydrogen, $C_1$–$C_{36}$ alkyl, $C_1$–$C_{36}$ alkoxy group, $C_6$–$C_{36}$. aryl, $C_7$–$C_{36}$ aralkyl, or $C_7$–$C_{36}$ aralkyloxy and n is 1–5.

In a specific embodiment, the end-capping reagent is preformed and consists essentially of one or more species of symmetrical activated aromatic carbonate, one or more species of optionally-substituted phenol and reaction products thereof. This preformed end-capping reagent may be equilibrated in a molten state prior to addition to a preformed polycarbonate, but such equilibration is not required. The molten end-capping reagent may be neat, or it may include appropriate solvents (such as PETS, or a mixture of toluene and acetone) to aid in handling. When the components of the end-capping reagent are added separately, they may be added as pellets, as a neat melt, or in an appropriate solvent.

When an equilibration step is included, it may be a pre-equilibration (preferably) or an in situ equilibration and may occur in the presence or absence of basic catalyst. It is particularly preferred to conduct the equilibration under conditions whereby transesterification of the optionally-substituted phenol by the symmetrical activated aromatic carbonate occurs. For example octadecylphenol and bis(methyl salicyl) carbonate in a molar ratio of 2:1 can be equilibrated to form bis(octadecylphenyl) carbonate and methyl salicylate, with the former being in solution in the latter when in the liquid state. This solution may be used for end-capping without separation of the two compounds.

Lower molar ratios than 2:1, most often from about 1:1 to 2:1, can be employed, whereby an asymmetric carbonate will be formed, at least formally. The use of end-capping reagents containing such asymmetric carbonates is also within the scope of the invention. Molar ratios greater than 2:1 will result in the presence of unreacted optionally-substituted phenol, and are not preferred.

The components used in the end-capping reagent and the relative amounts of the symmetrical activated aromatic carbonate and the optionally-substituted phenol in the end-capping reagent can be varied depending on the product characteristics desired. In general, using the end-capping reagent of the invention it is possible to obtain polycarbonate with some or all of the following advantageous characteristics: (1) lower free-hydroxyl endgroups resulting in improved thermal stability, lower water up-take, improved hydrolytic stability, and improved static performance compared to that of the polycarbonate that would result if no end-capping reagent were added; (2) equal or higher melt flow (or equal or lower melt viscosity) and improved shear-thinning rheological properties as compared to an unfunctionalized phenyl endcapped polycarbonate of similar molecular weight and polydispersity; (3) higher ductility compared to an unfunctionalized phenyl endcapped polycarbonate of similar molecular weight; and (4) lower glass transition temperature as a function of the functionalized phenyl endcap, as compared to an unfunctionalized phenyl endcapped polycarbonate of similar molecular weight. For example, glass transition temperatures in the range of 125 to 150° C. can be obtained.

Preparation of the end-capping reagent In one embodiment of the invention, the symmetrical activated carbonates are prepared using a method in which two equivalents of a substituted phenol is reacted with one equivalent of phosgene in an interfacial reaction using water and a chlorinated solvent such as methylene chloride and in the presence of a base such as sodium hydroxide to neutralize the liberated HCl. Additional catalysts may be employed in this reaction to facilitate the condensation reaction. In one embodiment, the condensation catalyst is triethyl amine, quaternary alkyl ammonium salt, or mixtures thereof. After completion of the condensation reaction, the organic product phase is washed with aqueous acid and then with water until the washings are neutral. The organic solvent may be removed by distillation and the end-capper is crystallized or distilled and recovered.

End-capping Reaction in the Polycarbonate Production Process: The end-capping reagent of the present invention is used to react with at least some of the free hydroxyl end-groups of the polycarbonate to produce an end-capped polycarbonate resin. The phenols having electron-withdrawing ortho-substituents generated in the capping reaction are less reactive than phenol in backbiting reactions, which lead to molecular weight degradation of the polycarbonate. Therefore, the by-product phenols are removed from the terminal-blocked polycarbonate by distillation to the over-head system using conventional means (i.e., freeze traps using chilled water as a coolant) where they can be condensed to expedite the end-capping reaction at high yields.

It should be noted that the end-capped polycarbonate may still contain small amounts of any unrecovered phenols, any unreacted end-capping reagent along with by-products of any side reactions to the end-capping reactions, e.g. terminal 2-(alkoxycarbonyl)phenyl groups and the like. In one embodiment, the end-capped polycarbonate contains about less than 500 ppm of phenols having electron-withdrawing ortho-substituents and about 500 ppm of unreacted terminal blocking agent of the present invention. In another embodiment, the end-capped polycarbonate contains about 2,500 ppm or less, preferably 1000 ppm or less of terminal 2-(alkoxycarbonyl)phenyl groups, such as terminal 2-methoxycarbonyl)phenyl groups.

In one embodiment, the phenols having electron-withdrawing ortho-substituents by-product of the following formula is recovered from the overhead system and reused to prepare new end-capping reagents.

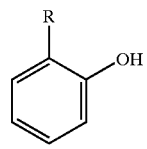

In accordance with the method of the invention, end-capping reagent containing activated and non-activated carbonates is combined with a preformed polycarbonate polymer having free hydroxyl end groups. The preformed polycarbonate polymer may be any type of polycarbonate, and can be formed by either melt transesterification or an interfacial process, although most commonly the preformed polycarbonate polymer would be formed from the melt transesterification process.

Melt Polycarbonate Process The process of the present invention is a melt or transesterification process. The production of polycarbonates by transesterification is well-known in the art and described, for example, in Organic Polymer Chemistry by K. J. Saunders, 1973, Chapman and Hall Ltd., as well as in a number of U.S. patents, including U.S. Pat. Nos. 3,442,854; 5,026,817; 5,097,002; 5,142,018; 5,151,491; and 5,340,905.

In the melt process, polycarbonate is produced by the melt polycondensation of aromatic dihydroxy compounds (A) and carbonic acid diesters (B). The reaction can be carried out by either a batch mode or a continuous mode. The apparatus in which the reaction is carried out can be any suitable type of tank, tube, or column. The continuous processes usually involve the use of one or more CSTR's and one or more finishing reactors.

Examples of the aromatic dihydroxy compounds (A) include bis(hydroxyaryl) alkanes such as bis(4-hydroxyphenyl)methane; 1,1-bis(4-hydroxyphenyl)ethane; 2,2-bis(4-hydroxyphenyl)propane (also known as bisphenol A); 2,2-bis(4-hydroxyphenyl)butane; 2,2-bis(4-hydroxyphenyl)octane; bis(4-hydroxyphenyl) phenylmethane; 2,2-bis(4-hydroxy-1-methylphenyl) propane; 1,1-bis(4-hydroxy-t-butylphenyl) propane; and 2,2-bis(4-hydroxy-3-bromophenyl)propane; bis(hydroxyaryl)cycloalkanes such as 1,1-(4-hydroxyphenyl)cyclopentane and 1,1-bis(4-hydroxyphenyl)cyclohexane; dihydroxyaryl ethers such as 4,4'-dihydroxydiphenyl ether and 4,4'dihydroxy-3,3'-dimethylphenyl ether; dihydroxydiaryl sulfides such as 4,4'-dihydroxydiphenyl sulfide and 4,4'-dihydroxy-3,3'-dimethyldiphenyl sulfide; dihydroxydiaryl sulfoxides such as 4,4'-dihydroxydiphenyl sulfoxide and 4,4'-dihydroxy-3,3'-dimethyldiphenyl sulfoxide; and dihydroxydiaryl sulfones such as 4,4'-dihydroxydiphenyl sulfone and 4,4'-dihydroxy-3,3'-dimethyldiphenyl sulfone. In one embodiment, the aromatic dihydroxy compound is bisphenol A (BPA).

Examples of the carbonic acid diesters (B) include diphenyl carbonate; ditolyl carbonate; bis(chlorophenyl) carbonate; m-cresyl carbonnate; and dinaphthyl carbonate. In one embodiment of an industrial process, diphenyl carbonate (DPC) is used.

The carbonic diester component may also contain a minor amount, e.g., up to about 50 mole % of a dicarboxylic acid or its ester, such as terephthalic acid or diphenyl isophthalate, to prepare polyesterpolycarbonates.

In preparing the polycarbonates, usually about 1.0 mole to about 1.30 moles of carbonic diester are utilized for every 1 mole of the aromatic dihydroxy compound. In one embodiment, about 1.01 moles to about 1.20 moles of the carbonic diester is utilized. This process can result in the formation of polycarbonate with a content of terminal alkylphenyl groups of about 0.25% or more, preferably 0.5 mole % or more.

Optional Terminators/End-capping Agents. In one embodiment of the melt process, additional/optional terminators or end-capping agents of the prior art may also be used. Examples of terminators include phenol, p-tert-butylphenol, p-cumylphenol, octylphenol, nonylphenol and other endcapping agents well-known in the art.

Optional Branching Agents. In one embodiment of the process of the present invention, branching agents are used as needed. Branching agents are well-known and may comprise polyfunctional organic compounds containing at least three functional groups, which may be hydroxyl, carboxyl, carboxylic anhydride, and mixtures thereof. Specific examples include trimellitic anhydride, tris(p-hydroxyphenyl)ethane, isatin-bisphenol, trisphenol TC (1,3, 5-tris((p-hydroxyphenyl)isopropyl)benzene), trisphenol PA (4(4(1,1-bis(p-hydroxyphenyl)-ethyl) alpha,alpha-dimethyl benzyl)phenol, and benzophenone tetracarboxylic acid.

Optional catalysts. The polycarbonate synthesis may be conducted in the presence of a catalyst to promote the transesterification reaction. Examples include alkali metals and alkaline earth metals by themselves or as oxides, hydroxides, amide compounds, alcoholates, and phenolates, basic metal oxides such as ZnO, PbO, and $Sb_2O_3$, organotitanium compounds, soluble manganese compounds, nitrogen-containing basic compounds and acetates of calcium, magnesium, zinc, lead, tin, manganese, cadmium, and cobalt, and compound catalyst systems such as a nitrogen-containing basic compound and a boron compound, a nitrogen-containing basic compound and an alkali (alkaline earth) metal compound, and a nitrogen-containing basic compound, an alkali (alkaline earth) metal compound, and a boron compound.

In one embodiment of the invention, the transesterification catalyst is a quaternary ammonium compound or a quaternary phosphonium compound. Non-limiting examples of these compounds include tetramethyl ammonium hydroxide, tetramethyl ammonium acetate, tetramethyl ammonium fluoride, tetramethyl ammonium tetraphenyl borate, tetraphenyl phosphonium fluoride, tetraphenyl phosphonium tetraphenyl borate, tetrabutyl phosphonium hydroxide, tetrabutyl phosphonium acetate and dimethyl diphenyl ammonium hydroxide.

The above-mentioned catalysts may each be used by themselves, or, depending on the intended use, two or more types may be used in combination. When more than one catalyst is employed, each may be incorporated into the melt at a different stage of the reaction. In one embodiment of the invention, part or all of one catalyst is added together with the end-capping reagent.

The appropriate level of catalyst will depend in part on how many catalysts are being employed, e.g., one or two. In general, the total amount of catalyst is usually in the range of about $1 \times 10^{-8}$ to about 1.0 mole per mole of the dihydroxy compound. In one embodiment, the level is in the range of about $1 \times 10^{-5}$ to about $5 \times 10^{-2}$ mole per mole of dihydroxy compound. When more than one catalyst is employed, each may be incorporated into the melt at a different stage of the reaction.

Other optional components in the polycarbonate In the present invention, the polycarbonate obtained may further contain at least one of a heat stabilizer, an ultraviolet absorbent, a mold releasing agent, a colorant, an anti-static agent, a lubricant, an anti-fogging agent, a natural oil, a synthetic oil, a wax, an organic filler and an inorganic filler, which are generally used in the art.

Adding the End-Capping Agent to the Melt Process

The method of adding the end-capping agent to polycarbonate is not specially limited. For example, the end-capping agent may be added to the polycarbonate as a reaction product in a batch reactor or a continuous reactor system. The end-capping reagent may be suitably added to molten polycarbonate and mixed in a static mixer. The end-capping reagent can also be combined with the polycarbonate in a reactor system which includes, in series, one or more reactors, one or more polymerizers and an extruder through which the polycarbonate is transported. In this case, the end-capping reagent is suitably added before one of the polymerizers, but after the polycarbonate has passed through at least the initial reactors to build up the desired molecular weight. In one embodiment, the end-capping agent is added to the melt polycarbonate just before or after a later reactor, i.e., a polymerizer, in a continuous reactor system. In a second embodiment, the end-capping agent is by reactive extrusion after the last polymerizer in the continuous reactor system. In a third embodiment, it is added between the $1^{st}$ and $2^{nd}$ polymerizer in a continuous reactor system. In yet another embodiment, the end-capping agent is added between the $2^{nd}$ reactor and the $1^{st}$ polymerizer.

The amount of end-capping reagent appropriately utilized can be quantified with reference to the amount of free hydroxyl end groups in the pre-formed polycarbonate polymer. In general, the mole ratio of total carbonate to free hydroxyl end groups is within the range of from 0.5 to 3.0, depending on the level of end-capping desired.

In some reactor systems and extruders, it may be difficult to reach the desired equilibrium ratio of introduced or incorporated non-activated and activated end-groups (the non-activated end groups are preferentially present at equilibrium) due to poor mixing, short residence time, or rapid volatilization of one component. In such a case the ratio of introduced non-activated to activated end groups can be favorably increased by melt mixing the activated carbonate and optionally-substituted phenol together in the presence of a small amount of basic catalyst (such as tetramethylammonium hydroxide) to produce a scrambled product consisting of a pre-equilibrated or statistical mixture of reactants. The invention will now be further described with reference to the following non-limiting examples.

Starting Material Polycarbonate In all examples, either starting polycarbonate grade A, B, C, or D was used. The starting materials were prepared by a melt process in a continuous reactor system with the following properties:

|  | Poly-carbonate A | Poly-carbonate B | Poly-carbonate C | Poly-carbonate D |
|---|---|---|---|---|
| Weight-average molecular weight Mw: | 8.11 * 10³ | 5.15 * 10³ | 18.5 * 10³ | 30.5 × 10³ g/mole* |
| Number-average molecular weight Mn: | 4.05 * 10³ | 2.73 * 10³ | 8.37 * 10³ | 14.1 × 10³ g/mole* |
| Free OH content: | 4020 | 6359 | 834 | 834 ppm |
| End-cap ratio | 52.1 | 49.3 | 79.5 | 81.0% |

*Polystyrene standards

In the Examples, the following measurements were made.
a) Molecular weight: Mw and Mn were measured by GPC analysis of 1 mg/ml polymer solutions in methylene chloride versus polystyrene standards. Unless otherwise stated the measured polycarbonate Mw and Mn values were then corrected for the difference in retention volume between polycarbonate and polystyrene standards.
b) Free-OH content was measured by UV/Visible analysis of the complexes formed from the polymer with $TiCl_4$ in methylene chloride solution. In some cases the Free OH content was measured by direct infrared or $^{31}P$ NMR methods.

End-cap levels were calculated from the free OH content and Mn values.

Incorporation levels of specific end groups were determined by NMR.

The glass transition temperature of some end-capped polycarbonates was measured by differential scanning calorimetry.

EXAMPLE 1

A batch reactor tube was charged with 25 g of the pre-formed polymer A, 0.1539 g (ratio endcapper to free-OH=0.5) nonylphenol and 0.2307 g (ratio endcapper to free-OH=0.5) bis(methyl salicyl) carbonate under nitrogen. The mixture was heated to a temperature of 300° C. and stirred for 20 minutes. After the melt mixing stage vacuum was applied to the system to a pressure of 0.5 mbar, and the reaction continued for 20 minutes. After the reaction the polymer was sampled from the reaction tube. As summarized in Table 2, the endcap ratio of the sample polycarbonate was increased from 52.1% to 83.5% and 0.47 mole percentage of the nonylphenol was incorporated in the polymer product.

EXAMPLE 2

Example 1 was repeated but instead of nonylphenol 0.1833 g (ratio endcapper to free-OH=0.5) dodecylphenol and 0.2307 g (ratio endcapper to free-OH=0.5) bis(methyl salicyl) carbonate was used. As summarized in Table 2, the endcap ratio of the sample polycarbonate was increased from 52.1% to 83.0% and 0.42 mole percentage of the dodecylphenol was incorporated in the polymer product.

EXAMPLE 3

Example 1 was repeated but instead of nonylphenol 0.2127 g (ratio endcapper to free-OH=0.5) meta-pentadecylphenol and 0.2307 g (ratio endcapper to free-OH=0.5) bis(methyl salicyl) carbonate was used. As summarized in Table 2, the endcap ratio of the sample polycarbonate was increased from 52.1% to 80.9% and 0.44 mole percentage of the meta-pentadecylphenol was incorporated in the polymer product.

EXAMPLE 4

In this example, a continuous reaction system was used. The apparatus consists of one monomer mix agitation tank, two pre-polymerization tanks and one horizontally agitated polymerization tank. Bisphenol A and diphenyl carbonate in a molar ratio of 1.08:1 were continuously supplied to a heated agitation tank where a uniform solution was produced. About 250 eq ($2.5*10^{-4}$ mol/mol bisphenol A) tetramethylammonium hydroxide and 1 eq ($1.10^{-6}$ mol/mol bisphenol A) of NaOH were added to the solution as catalysts in the first pre-polymerization tank. The solution was then successively supplied to the next pre-polymerization tank and the horizontally agitated polymerization tank, arranged in sequence, and the polycondensation was allowed to proceed to produce a starting polymer "B" emerging from the outlet stream of the second pre-polymerization tank for Example 4 with a Mw of 4150 g/mol, an Mn of 2730 g/mol, and an endcap level of about 49%.

For example 4, a 2:1 molar ratio of bis(methyl salicyl) carbonate and dodecylphenol was added by means of a heated static mixer to the molten polymer outlet stream of the pre-polymerization tanks (inlet stream of the horizontally agitated polymerization tank) in an amount of 5.7 mass % relative to the molten polymer stream. As summarized in Table 2, the endcap ratio of the sample polycarbonate was increased from 49.3% to 87.0% and 1.08 mole percentage of the dodecylphenol was incorporated in the polymer product.

EXAMPLE 5

Example 4 was repeated but instead a 2:1 molar ratio of bis(methyl salicyl) carbonate and dodecylphenol was added in an amount of 11.4 mass % relative to the molten polymer stream. As summarized in Table 2, the endcap ratio of the sample polycarbonate was increased from 49.3% to 90.7% and 1.56 mole percentage of the dodecylphenol was incorporated to the polymer chain end.

EXAMPLE 6

A batch reactor tube is charged with 25 g of the pre-formed polymer C, 0.6793 g (ratio endcapper to free-OH=

1.25) meta-pentadecylphenol and 1.19 g(ratio endcapper to free-OH=0.5) bis(methyl salicyl) carbonate under nitrogen. The mixture was heated to a temperature of 270° C. and stirred for 20 minutes. After the melt mixing stage vacuum was applied to the system to a pressure of 0.5 mbar, and the reaction continued for 30 minutes. After the reaction the polymer was sampled from the reaction tube. As summarized in Table 2, the endcap ratio of the sample polycarbonate was increased from 79.5% to 98.5% and 0.72 mole percentage of the meta-pentadecylphenol was incorporated to the polymer chain end.

Comparative Example 1

Example 1 was repeated but instead of using nonylphenol and bis(methyl salicyl) carbonate no endcapper is charged to the reactor tube. The results are summarized in Table 2.

Comparative Example 2

Example 3 was repeated but instead of using meta-pentadecylphenol and bis(methyl salicyl) carbonate only 0.2127 g (ratio endcapper to free-OH=0.5) of meta-pentadecylphenol is charged to the reactor tube. The results are summarized in Table 2.

Comparative Example 3

Example 4 was repeated but instead of using dodecylphenol and bis(methyl salicyl) carbonate no endcapper is charged to the continuous reactor system. The results are summarized in Table 2.

EXAMPLE 7

A melt transesterification reaction was carried out in a 90 milliliter stainless steel batch reactor equipped with a stainless steel twisted stir paddle and borosilicate glass reactor head. The polycarbonate D (31.0 g), bis(methyl salicyl) carbonate (0.49 g, molar ratio to free OH=0.98), and meta-pentadecylphenol (0.442 g, molar ratio to free OH=0.95) were quickly added into the well of the preheated reactor (180° C.). Then the reactor was then placed a 300° C. pre-heated aluminum jacket and the remaining apparatus assembled under gentle argon purge. Initially, the melt was thermally equilibrated by stirring at 10 to 80 RPM under a slight argon purge for 5 minutes. Then, while stirring at 40 to 80 RPM, the pressure over the reactor was reduced over 5 minutes to 0.5 to 2 Torr. Stirring continued for 20 minutes under vacuum and volatiles were collected in a cold-trap. The reactor was then repressurized with argon and molten resin immediately ejected from the bottom of the reactor onto a collection tray.

A resin was obtained and characterized as follows: Mw=31250, Mn=14545 (polystyrene standards), Tg=137° C. Subsequent reprecipitation (using methanol and methylene chloride) provided a white powder with incorporated alkylphenol endcapper=1.46 mol % and endcapping=96%.

EXAMPLE 8

Example 7 was repeated but the stainless steel batch reactor was charged instead with polycarbonate D (31 g), bis(methyl salicyl) carbonate (0.49 g, molar ratio to free OH=0.98), and octadecylphenol (0.50 g, molar ratio to free OH=0.95). An end-capped resin was obtained and characterized as follows: Mw=30856, Mn=14467 (polystyrene standards), Tg=134° C. Subsequent reprecipitation (using methanol and methylene chloride) provided a white powder with incorporated alkylphenol endcapper=0.85 mol % and endcapping=94.5%.

EXAMPLE 9

Example 7 was repeated but the stainless steel batch reactor was charged instead with polycarbonate D (30.0 g), bis(methyl salicyl) carbonate (0.97 g, molar ratio to free OH=2.00), and 4-tert-butylphenol (0.22 g, 1.47 mmol, molar ratio to free OH=1.00). An end-capped resin was obtained and characterized as follows: Mw=36442, Mn=19382 (polystyrene standards), Tg=147° C. Subsequent reprecipitation (using methanol and methylene chloride) provided a white powder with incorporated alkylphenol endcapper= 1.05 mol % and endcapping=96.5%.

Comparative Example 4

Example 7 was repeated but the stainless steel batch reactor was charged instead with polycarbonate D (31.0 g), bis(methyl salicyl) carbonate (0.49 g, 1.48 mmol, molar ratio to free OH=0.98), and no alkylphenol endcapper. An endcapped resin was obtained and characterized as follows: Mw=39090 and Mn=17314 (polystyrene standards), Tg=145° C., incorporated methyl salicylate endcapper=0.74 mol % and endcapping=98.9%.

Comparative Example 5

Example 7 was repeated but the stainless steel batch reactor was charged instead with polycarbonate D (31.0 g), no bis(methyl salicyl) carbonate, and meta-pentadecylphenol (0.442 g, molar ratio to free OH=0.95). An end-capped resin was obtained and characterized as follows: Mw=24819, Mn=11497 (polystyrene standards), Tg=131° C. Subsequent reprecipitation (using methanol and methylene chloride) provided a white powder with incorporated alkylphenol endcapper=1.02 mol % and endcapping=81%.

EXAMPLE 10

A mixture of 5.78 g (17.4 mmol) of bis(methyl salicyl) carbonate, 5.20 g (34.6 mmol) of 4-t-butylphenol and 18 µl of a 0.001 M aqueous sodium hydroxide solution was purged with argon, heated at 290–295° C. for 9 minutes and allowed to cool. It was found by proton nuclear magnetic resonance spectroscopy to be a 47% (by weight) solution of bis(4-t-butylphenyl) carbonate in methyl salicylate, and was useful as an end-capping reagent.

EXAMPLE 11

Bis(methyl salicyl) carbonate (5.78 g, 17.4 mmol), octadecylphenol (12.0 g, 34.6 mmol), and 18 µl of a 0.001 M aqueous sodium hydroxide solution was purged with argon, heated at 290–295° C. for 9 minutes and allowed to cool. It was found by proton nuclear magnetic resonance spectroscopy to be a mixture of methyl salicylate and bis (octadecylphenyl) carbonate (2:1 molar ratio). The methyl salicylate was removed by distillation to provide pure bis-octadecylphenyl carbonate, and was useful as an end-capping reagent.

Comparative Example 5

Diphenyl carbonate (3.97 g, 17.4 mmol), octadecylphenol (12 g, 34.6 mmol), and 18 µl of a 0.001 M aqueous sodium hydroxide solution was purged with argon, heated at 295° C. for 9 minutes and allowed to cool. The resulting liquid was characterized by proton nuclear magnetic resonance spectroscopy which indicated that only half of the octadecylphenol had reacted. The reaction products were an undetermined mixture of symmetrical and asymmetrical carbonates.

EXAMPLE 12

Bis(methyl salicyl) carbonate (5.78 g, 17.4 mmol), octadecylphenol (6.0 g, 17.4 mmol) and 18 μL 0.001 M aqueous sodium hydroxide solution were combined and purged with argon. The mixture was heated at 295° C. for 9 minutes and allowed to cool. The resulting liquid was characterized by proton nuclear magnetic resonance spectroscopy which indicated complete consumption of the octadecylphenol and nearly complete consumption of the bis(methyl salicyl) carbonate (18 mole percent remaining). These facts suggest that the predominant carbonate product was an asymmetric carbonate, with the remainder being the symmetrical carbonate of octadecylphenol. The mixture was useful as an end-capping agent.

TABLE 1

Examples of Symmetrical Activated Carbonates

| Structure | Name (abbreviation) | Data |
|---|---|---|
| [structure] | Bis(methyl salicyl) carbonate (bMSC) | MW = 330<br>mp 109° C.[1] |
| [structure] | BPA-bis(methylsalicyl) carbonate | MW = 572 |
| [structure] | Bis(ethyl salicyl) carbonate (bESC) | MW = 358 |
| [structure] | Bis(propyl salicyl) carbonate (bPrSC) | MW = 386<br>mp = 57–58° C. |
| [structure] | bis(2-benzoylphenyl) carbonate | MW = 422<br>mp = 111–112° C. |
| [structure] | Bis(phenyl salicyl) carbonate (bPhSC) | MW = 454 |
| [structure] | Bis(benzyl salicyl) carbonate (bBSC) | MW = 482<br>mp = 68.5–71° C. |

TABLE 2

Examples of Endcapping

| Example | PC Type | Name and structure | Endcapper EC/Free-OH mole-ratio | Mw (g/mole) | Mn (g/mole) | Endcap ratio(%) | mole % incorp. |
|---|---|---|---|---|---|---|---|
| Example 1 | A | b-methyl salicyl carbonate + 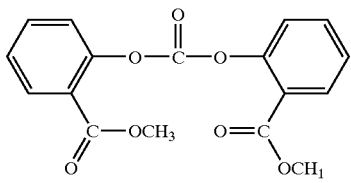 | 0.50 | 21478 | 10386 | 83.5 | 0.47 |
| | | Nonylphenol 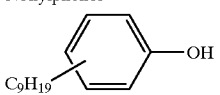 | 0.50 | | | | |
| Example 2 | A | b-methyl salicyl carbonate + Dodecylphenol 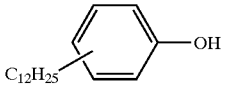 | 0.50 0.50 | 18291 | 8984 | 83.0 | 0.42 |
| Example 3 | A | b-methyl salicyl carbonate + meta-pentadecylphenol 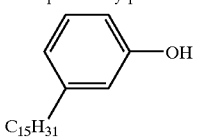 | 0.50 0.50 | 19572 | 10631 | 80.9 | 0.44 |
| Example 4 | B | b-methyl salicyl carbonate + Dodecylphenol | 2.0 1.0 | 16768 | 8910 | 87 | 1.08 |
| Example 5 | B | b-methyl salicyl carbonate + Dodecylphenol | 2.0 1.0 | 14371 | 7905 | 90.7 | 1.56 |
| Example 6 | C | b-methyl salicyl carbonate + meta-pentadecylphenol | 2.00 1.25 | 15428 | 8290 | 98.5 | 0.72 |
| Comparative example 1 | A | — | — | 17870 | 8171 | 75.9 | NA |
| Comparative example 2 | A | meta-pentadecylphenol | 0.50 | 9674 | 5257 | 68.4 | 0.32 |
| Comparative example 3 | B | — | — | 18558 | 9988 | 41.2 | NA |
| Example 7 | D | b-methyl salicyl carbonate + meta-pentadecylphenol | 0.98 0.95 | 31250* | 14545* | 96.0 | 1.46 |
| Example 8 | D | b-methyl salicyl carbonate + octadecylphenol | 0.98 0.95 | 30856* | 14467* | 94.5 | 0.85 |
| Example 9 | D | b-methyl salicyl carbonate + 4-tert-butylphenol 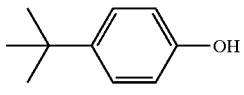 | 2.0 1.0 | 36442* | 19382* | 96.5 | 1.05 |
| Comparative example 4 | D | b-methyl salicyl carbonate | 0.98 | 39090* | 17314* | 98.9 | 0.74 |
| Comparative example 5 | D | meta-pentadecylphenol | 0.95 | 24819* | 11497* | 81.0 | 1.02 |

What is claimed is:

1. A method for preparing an end-capped polycarbonate resin, comprising the steps of
   pre-equilibrating at least one species of symmetrical activated aromatic carbonate and at least one species of an optionally-substituted phenol, the pre-equilibration occurring in the presence or absence of basic catalyst to form an end-capping reagent, and
   processing a mixture comprising a polycarbonate having free hydroxyl-end groups and the end-capping reagent in a melt transesterification reaction to produce a polycarbonate resin,
   whereby said end-capping reagent reacts with at least some of the free hydroxyl end-groups of the polycarbonate to produce an end-capped polycarbonate resin.

2. The method of claim 1, wherein the end-capping reagent contains the symmetrical activated aromatic carbonate and the optionally-substituted phenol in a mole ratio of from 10:90 to 90:10.

3. The method of claim 2, wherein the end-capping reagent is added in an amount such that the mole ratio of total carbonate in the end-capping reagent to free-hydroxyl end groups is from 0.5 to 3.

4. The method of claim 1, wherein the end-capping reagent is added in an amount such that the mole ratio of total carbonate in the end-capping reagent to free-hydroxyl end groups is from 0.5 to 3.

5. The method of claim 1, wherein the end-capping reagent comprises as a symmetrical activated aromatic carbonate a compound of the formula:

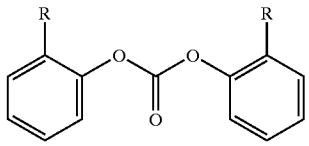

wherein R is an electronegative substituent.

6. The method of claim 5, wherein the electronegative substituent R is a nitro, halo, or carbonyl-containing group.

7. The method of claim 6, wherein the electronegative substituent R is methoxycarbonyl, ethoxycarbonyl, propoxycarbonyl, phenylcarbonyl, phenoxycarbonyl, or benzyloxycarbonyl.

8. The method of claim 7, the electronegative substituent R is methoxycarbonyl.

9. The method of claim 6, wherein the end-capping reagent contains the symmetrical activated aromatic carbonate and the optionally-substituted phenol in a mole ratio of from 10:90 to 90:10.

10. The method of claim 9, wherein the end-capping reagent is added in an amount such that the mole ratio of total carbonate in the end-capping reagent to free-hydroxyl end groups is from 0.5 to 3.

11. The method of claim 6, wherein the end-capping reagent is added in an amount such that the mole ratio of total carbonate in the end-capping reagent to free-hydroxyl end groups is from 0.5 to 3.

12. The method of claim 5, wherein the optionally-substituted phenol is a compound of the general formula:

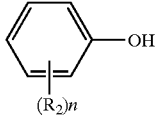

wherein each of the substituents $R_2$ is independently H, $C_1$–$C_{36}$ alkyl, $C_1$–$C_{36}$ alkoxy, $C_6$–$C_{36}$ aryl, $C_6$–$C_{36}$ aryloxy, $C_7$–$C_{36}$ arylalkyl, or $C_7$–$C_{36}$ arylalkoxy and n is an integer between 1 and 5.

13. The method of claim 12, wherein the optionally-substituted phenol is phenol, p-cumylphenol, 4-tert-butylphenol, octylphenol, nonylphenol, dodecylphenol, 3-pentadecylphenol, or octadecyiphenol.

14. The method of claim 12, wherein the optionally-substituted phenol is 4-tert-butylphenol, nonylphenol, dodecylphenol, 3-pentadecylphenol, or octadecylphenol.

15. The method of claim 1, wherein the end-capping reagent comprises as a symmetrical activated aromatic carbonate a compound of the formula:

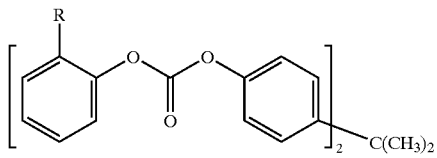

wherein R is an electronegative substituent.

16. The method of claim 15, wherein the electronegative substituent R is nitro, halo, or a carbonyl-containing group.

17. The method of claim 16, wherein the end-capping reagent contains the symmetrical activated aromatic carbonate and optionally-substituted phenol in a mole ratio of from 10:90 to 90:10.

18. The method of claim 17, wherein the end-capping reagent is added in an amount such that the mole ratio of total carbonate in the end-capping reagent to free-hydroxyl end groups is from 0.5 to 3.

19. The method of claim 15, wherein the optionally-substituted phenol is a compound of the general formula:

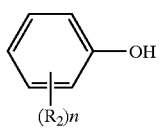

wherein each of the substituents $R_2$ is independently H, $C_1$–$C_{36}$ alkyl, $C_1$–$C_{36}$ alkoxy, $C_6$–$C_{36}$ aryl, $C_6$–$C_{36}$ aryloxy, $C_7$–$C_{36}$ arylalkyl, or $C_7$–$C_{36}$ arylalkoxy and n is an integer between 1 and 5.

20. The method of claim 19, wherein the optionally-substituted phenol is phenol, p-cumylphenol, 4-tert-butylphenol, octylphenol, nonylphenol, dodecylphenol, 3-pentadecylphenol, or octadecylphenol.

21. The method of claim 19, wherein the optionally-substituted phenol is 4-tert-butylphenol, nonylphenol, dodecylphenol, 3-pentadecylphenol, or octadecylphenol.

22. The method of claim 1, wherein the optionally-substituted phenol is a compound of the general formula:

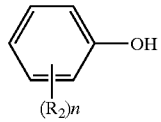

wherein each of the substituents $R_2$ is independently H, $C_1$–$C_{36}$ alkyl, $C_1$–$C_{36}$ alkoxy, $C_6$–$C_{36}$ aryl, $C_6$–$C_{36}$ aryloxy, $C_7$–$C_{36}$ arylalkyl, or $C_7$–$C_{36}$ arylalkoxy and n is an integer between 1 and 5.

23. The method of claim 22, wherein the optionally-substituted phenol is phenol, p-cumylphenol, 4-tert-butylphenol, octylphenol, nonylphenol, dodecylphenol, 3-pentadecylphenol, or octadecyiphenol.

24. The method of claim 22, wherein the optionally-substituted phenol is 4-tert-butylphenol, nonylphenol, dodecylphenol, 3-pentadecylphenol, or octadecylphenol.

25. The method according to claim 1, wherein the end-capping reagent is added to the polycarbonate in a reactor system of the continuous or semi-continuous type.

26. The method according to claim 25, wherein the reactor system consists of two or more reactors in series.

27. The method according to claim 25, wherein the end-capping reagent is added to the polycarbonate using a static mixer.

28. The method according to claim 1, wherein the formed polycarbonate has a content of phenols having electron-withdrawing ortho-substituents generated in the end-capping reaction of 500 ppm or below.

29. The method according to claim 1, wherein the formed polycarbonate has a content of phenols having electron-withdrawing ortho-substituents generated in the end-capping reaction of 100 ppm or below.

30. The method according to claim 1, wherein the formed polycarbonate has a content of end-capping reagent of 500 ppm or below.

31. The method according to claim 1, wherein the formed polycarbonate has a content of end-capping reagent of 100 ppm or below.

32. The method according to claim 1, wherein the formed polycarbonate has a content of terminal 2-(alkoxycarbonyl)phenyl, 2-(phenoxycarbonyl)phenyl-, 2-(benzyloxycarbonyl)phenyl, and 2-benzoylphenyl groups of 5,000 ppm or below.

33. The method according to claim 1, wherein the formed polycarbonate has a content of terminal 2-(methoxycarbonyl)phenyl groups of 2,500 ppm or below.

34. The method according to claim 1, wherein the formed polycarbonate has a content of terminal 2-(methoxycarbonyl)phenyl groups of 1,000 ppm or below.

35. The method according to claim 1, wherein the formed polycarbonate has a content of terminal alkylphenyl groups of about 0.25 mole % or more.

36. The method according to claim 1, wherein the formed polycarbonate has a content of terminal alkylphenyl groups of about 0.5 mole % or more.

37. The method according to claim 1, wherein the formed polycarbonate has a glass transition temperature of about 125 to 150° C.

38. The method according to claim 1, wherein the formed polycarbonate has a melt viscosity equal to or less than a phenyl-capped melt polycarbonate of similar number average molecular weight and polydispersity.

39. The method according to claim 1, wherein the optionally-substituted phenol and symmetrical activated aromatic carbonate are present during equilibration in a molar ratio of at most 2:1.

40. The method of claim 39, wherein the symmetrical activated aromatic carbonate a compound has the formula:

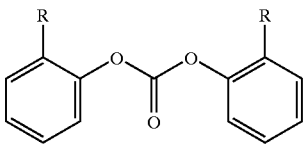

wherein R is an electronegative substituent.

41. The method of claim 40, wherein the electronegative substituent R is a nitro, halo, or carbonyl-containing group.

42. The method of claim 41, wherein the electronegative substituent R is methoxycarbonyl, ethoxycarbonyl, propoxycarbonyl, phenylcarbonyl, phenoxycarbonyl, or benzyloxycarbonyl.

43. The method of claim 42, wherein each electronegative substituent R is methoxycarbonyl.

44. The method of claims 39, wherein the optionally-substituted phenol is a compound of the general formula:

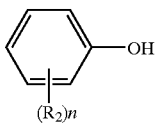

wherein each of the substituents $R_2$ is independently H, $C_1$–$C_{36}$ alkyl, $C_1$–$C_{36}$ alkoxy, $C_6$–$C_{36}$ aryl, $C_6$–$C_{36}$ arloxy, $C_7$–$C_{36}$ arylalkyl, or $C_7$–$C_{36}$ arylalkoxy and n is an integer between 1 and 5.

45. The method of claim 44, wherein the optionally-substituted phenol is phenol, p-cumylphenol, 4-tert-butylphenol, octylphenol, nonylphenol, dodecylphenol, 3-pentadecylphenol, or octadecylphenol.

46. The method of claim 44, wherein the optionally-substituted phenol is 4-tert-butylphenol, nonylphenol, dodecylphenol, 3-pentadecylphenol, or octadecylphenol.

47. An end-capping reagent consisting essentially of an equilibrated mixture of:
 (a) one or more species of symmetrical activated aromatic carbonate, and
 (b) one or more species of an optionally substituted phenol, optionally in solvent, and optionally including a basic transesterification catalyst,
wherein the optionally substituted phenol and activated aromatic carbonates are equilibrated in a molar ratio of at most 2:1.

* * * * *